United States Patent
Angotti et al.

Patent Number: 5,090,047
Date of Patent: Feb. 18, 1992

[54] APPARATUS FOR REPRODUCIBLY POSITIONING AN IMAGE RECEPTOR FOR INTRAORAL DIAGNOSTICS

[75] Inventors: Marshall A. Angotti, New Salem Borough; Frank J. Lopez, Hanover Borough; Richard C. Margraf, Upper Moreland Township, Montgomery County, all of Pa.

[73] Assignee: Applied Research Company, Hanover, Pa.

[21] Appl. No.: 601,867

[22] Filed: Oct. 23, 1990

[51] Int. Cl.$^5$ .......................... G03B 42/04; A61B 6/14
[52] U.S. Cl. .................... 378/170; 378/168; 378/205
[58] Field of Search ............ 378/170, 169, 168, 167, 378/177, 205

[56] References Cited

U.S. PATENT DOCUMENTS

| | | |
|---|---|---|
| 1,719,106 | 7/1929 | Cressler . |
| 3,745,344 | 7/1973 | Updegrave .................. 250/70 |
| 3,874,084 | 4/1975 | Cole ........................ 433/141 |
| 4,251,732 | 2/1981 | Fried ....................... 250/479 |
| 4,295,050 | 10/1981 | Linden ..................... 250/479 |
| 4,554,676 | 11/1985 | Maldonado et al. ......... 378/170 |
| 4,598,416 | 7/1986 | Donato ..................... 378/168 |
| 4,707,847 | 11/1987 | Van Aken .................. 378/170 |
| 4,866,750 | 9/1989 | Chavarria et al. .......... 378/170 |

*Primary Examiner*—Janice A. Howell
*Assistant Examiner*—David P. Porta
*Attorney, Agent, or Firm*—Charles J. Long

[57] ABSTRACT

Apparatus for positioning an image receptor, such as X-ray film, within a patient's mouth in predetermined relation to an energy beam, such as an X-ray beam, generated externally of the patient's mouth, includes rigid structure supporting an image receptor and connecting it to the source of the energy beam, and a bite block removably attached to the rigid structure in a position such that the portion of the patient's maxilla and mandible gripping the bite block is removed from the portion being studied with the energy beam. The attachment system further provides for attachment of the bite block at any of a plurality of discrete sites relative to the image receptor. Bite registration material is preferably provided on the bite block surfaces to allow precise repositioning of the bite block in a series of successive exposures. The apparatus allows a plurality of target areas to be studied using one bite block position within the patient's mouth.

8 Claims, 2 Drawing Sheets

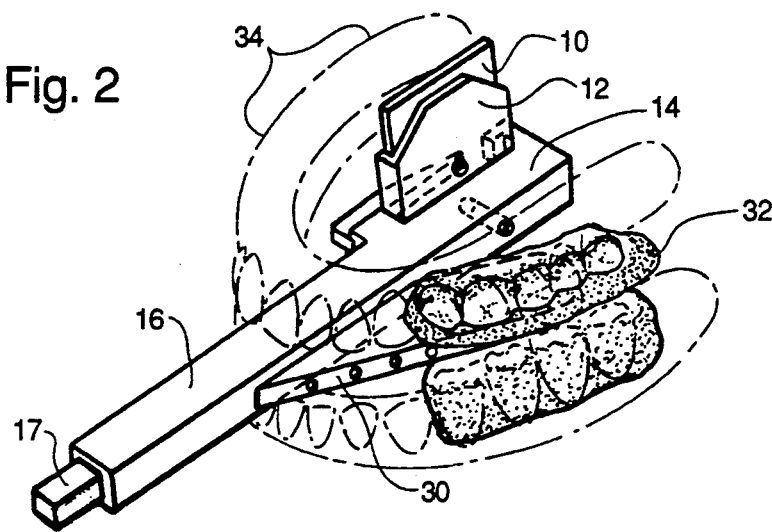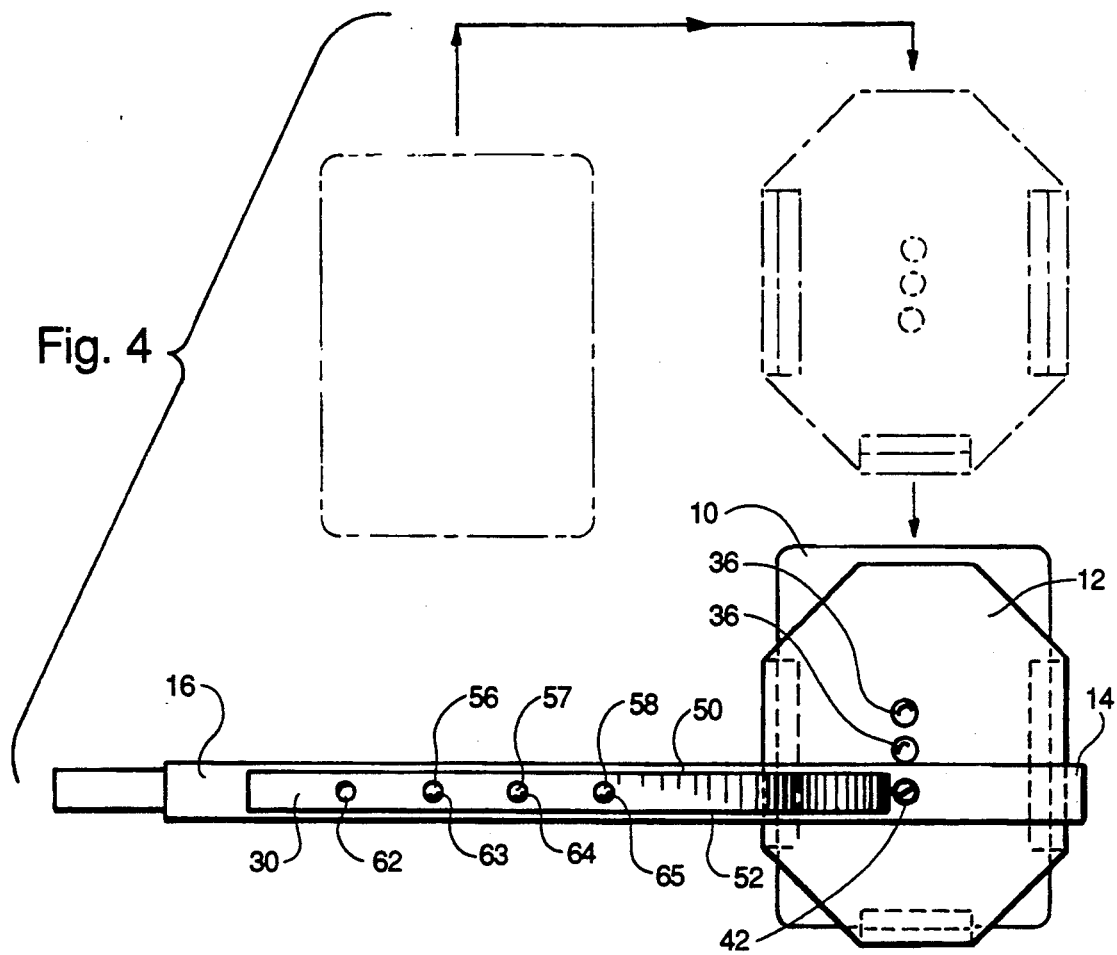

APPARATUS FOR REPRODUCIBLY POSITIONING AN IMAGE RECEPTOR FOR INTRAORAL DIAGNOSTICS

BACKGROUND OF THE INVENTION

1. Field of the Invention

This invention relates to apparatus for intraoral diagnostic studies. More particularly, the invention relates to apparatus for accurately positioning an image receptor, such as an X-ray film, in a patient's mouth in predetermined relation to an energy beam, such as an X-ray beam, to thereby enable the generation of diagnostically-useful images of portions of the patient's alveolar ridge and/or teeth. The apparatus of our invention allows precise re-positioning of the image receptor so that a series of images of predetermined target areas can be produced at successive times.

2. Description of the Prior Art

Intraoral X-ray diagnosis involves positioning an X-ray film within a patient's oral cavity next to the inner surface of the target, i.e., the teeth or alveolar bone being studied, then exposing the film to an X-ray beam generated outside the oral cavity and passing through the target. Historically, the film has been mounted in a holder which includes a bite block portion extending from the film in the direction of the external X-ray tube; the patient bites down on the bite block with the teeth comprising the target and thereby holds the film in position next to the target.

It is known that in normal dental X-ray practice, precise positioning of the X-ray film with respect to a suitably collimated X-ray beam can minimize the amount of radiation to which the patient is exposed.

A recent diagnostic technique for monitoring progressive or recurring alveolar bone loss is known as digital subtraction radiography (DSR). In this technique, the area of study is X-rayed at at least two different times. Digital computer procedures are then used to reveal any changes occurring in the target area between the initial and follow-up exposures. It is well known that reproducible positioning of the film, both with respect to the X-ray beam and especially with respect to the target area, is critical to the effective use of DSR.

In attempting to meet the need for reproducible film positioning, both for DSR and for other intraoral procedures, and to minimize the patient's exposure to radiation, prior workers have developed a number of devices which have succeeded in varying degrees. Some examples of such devices can be found in the following listed U.S. patents:

| Film holders: | 1,719,106 |
| | 4,251,732 |
| | 4,295,050 |
| Film holders plus | 3,745,344 |
| connections to | 4,554,676 |
| X-ray unit: | 4,598,416 |
| | 4,707,847 |

The features of the devices disclosed by the above-listed patents can be summarized as follows:

1. Virtually all of them include a bite block which extends from the film in the direction of the X-ray source—i.e., which is gripped by the patient's maxilla and mandible at or immediately adjacent to the area of study.

2. In all but one, the bite block and film holder form a unitary structure. In the one exception, U.S. Pat. No. 4,707,847, the bite block includes a sleeve which fits and is slidable along a ridge on the film holder running parallel to the film surface; however, the ridge has no locating stops for the bite block, which means that the block cannot be firmly fixed in position with respect to the film.

3. Several (e.g., U.S. Pat. No. 4,554,676) provide for slidable adjustment of the film in the vertical direction—i.e., perpendicular to the bite block, and one (U.S. Pat. No. 4,251,732) includes several different film holding slots at different points on a unitary bite block-film holder member.

4. Of the four which include structures connecting the film holder to the X-ray unit, three (U.S. Pat. Nos. 3,745,344; 4,554,676; 4,598,416) also include means to collimate the X-ray beam to limit exposure of the patient to radiation. In none of the four does the connecting structure appear to be very rigid, which means that accidental patient movements could cause deflection of the support member and thereby move the film out of precise alignment with the X-ray beam.

5. Bite registration material is commonly used on the bite block, whereby an impression of the patient's teeth made at the initial exposure provides a means of more accurately locating the film in subsequent exposures.

Although the positioning devices of the prior art have been generally successful in facilitating sequential diagnostic studies of a patient's alveolar ridge and/or teeth supported thereby, several shortcomings have existed. First, many of the prior art devices are difficult and/or complicated to set up and adjust. Second, position adjustability of the bite block with respect to the film is generally not possible, or if possible, is subject to slippage. Third, having the bite block gripped between the patient's jaws in the immediate vicinity of the target area can mean loss of film position reproducibility in the event of rapid or severe deterioration of the teeth or bone in the target area.

SUMMARY OF THE INVENTION

We have developed apparatus for positioning an X-ray film or other image receptor in a patient's mouth which both overcomes the above-discussed shortcomings and achieves other advantages over similar devices heretofore available.

In accordance with the invention, we provide, in apparatus for positioning an image receptor within a patient's mouth in predetermined relation to an energy beam generated by means located externally of the patient's mouth, whereby the energy beam passes through a target comprising a portion of the patient's alveolar ridge and such teeth as are supported thereby, is altered by predetermined characteristics of the target and as so altered strikes the image receptor to cause production of an image which facilitates diagnostic studies of the target, the improvement comprising, in combination: (a) image receptor support means; (b) connecting means rigidly connecting the image receptor support means to the energy beam generating means; (c) a rigid bite block having upper and lower bite surfaces adapted to be held between the patient's maxilla and mandible when the patient bites down thereon; and (d) means removably attaching the bite block to the connecting means in a position such that the bite block can be held between the maxilla and the mandible of the patient at a location removed from the target, the attachment means further providing for attachment of the bite block at any of a plurality of discrete sites relative to the image receptor, whereby a plurality of targets can be studied using one bite block position within the patient's mouth.

Preferably, the connecting means include a connecting bar extending generally at right angles to the axis of the energy beam, the image receptor support means being located at one end of the connecting bar, and the bite block attachment means comprise (a) a predetermined number of straight pins of uniform dimensions fixed to and projecting from the connecting bar, the pins being parallel and co-planar, the distances between adjacent pins being constant; and (b) a plurality of parallel bores formed in the bite block at spacing equal to that of the pins, the size of the bores being such that the pins can be slidably closely received therein, the number of bores being at least one more than the number of pins.

In a preferred embodiment, the upper and lower bite surfaces are parallel to the longitudinal axis of the connecting bar, the bite block has a generally elongated shape, and the longitudinal axis of the bite block forms an acute angle with the longitudinal axis of the connecting bar.

With regard to the preferred bite block attachment means, we prefer to use three pins projecting from the connecting bar and four bores in the bite block.

In a preferred environment for use of our apparatus, the energy beam is an X-ray beam and the image receptor comprises X-ray film.

In a preferred embodiment, our apparatus further includes bite registration material applied to the bite block in such manner as to take an impression of the patient's teeth, or of a prosthetic device supported in a fixed position by the patient's alveolar ridge, whereby the bite block location in relation to said teeth or prosthetic device will remain constant for repeated uses of the bite block. Preferably the bite registration material comprises an ethyl-vinyl acetate copolymer resin, and one which contains from 9 to 33 weight percent of vinyl acetate is especially preferred.

Other details, objects and advantages of the invention will become apparent as the following description of a certain present preferred embodiment thereof proceeds.

BRIEF DESCRIPTION OF THE DRAWINGS

In the accompanying drawings, we have shown a present preferred embodiment of the invention in which

FIG. 2 is a perspective view of the connecting bar of our invention with the film and bite block in place thereon, showing the relationship of a patient's teeth to the apparatus in one position of use;

FIG. 4 is a rear view of the arrangement of FIG. 3 illustrating the relationship of the X-ray film and its mounting cassette, and the placement of both within the mounting bracket.

DESCRIPTION OF THE PREFERRED EMBODIMENT

Figure 1:
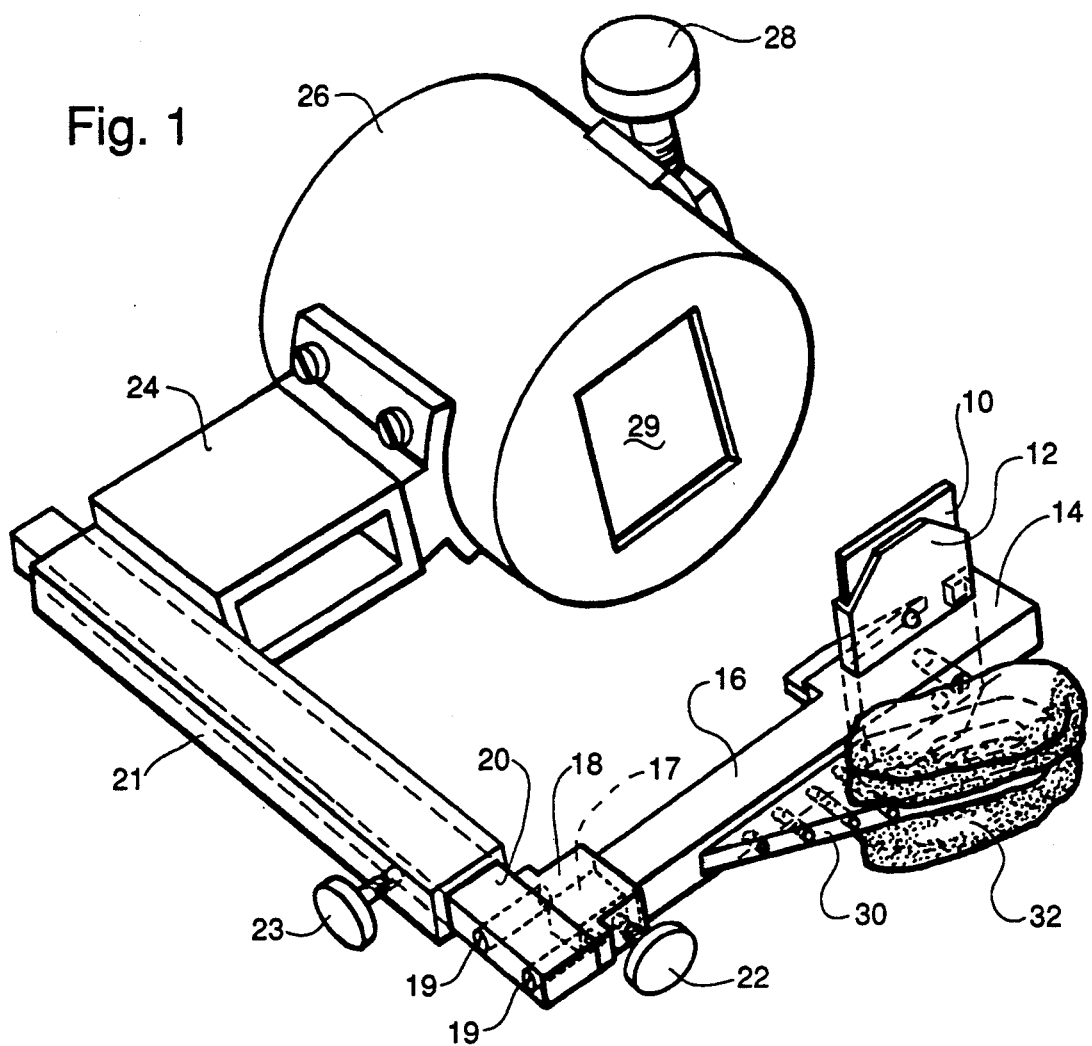
FIG. 1 is a perspective view of the apparatus of our invention as utilized in X-ray diagnostics.

Referring first to FIG. 1, there is shown an embodiment of the invention arranged for intraoral X-ray diagnostics of targets in the right bite wing and posterior portions of the patient's alveolar ridges. In this embodiment, the image receptor is a piece of X-ray film 10. Film 10 is mounted in a cassette 12 which maintains the film firmly in a planar condition, thereby avoiding out of focus areas resulting from bowing of the film, which is generally flexible itself and is encased in a flexible envelope of vinyl or the like. The cassette 12 is in turn slidably mounted in a generally C-shaped bracket 14 formed at one end of a connecting bar 16. Cassette 12 and bracket 14 comprise support means for the X-ray film. The end 17 of connecting bar 16 opposite the X-ray film is removably received in a socket member 18 which is connected by screws 19 to a bar 20 telescoped within a tube 21. Set screw 22 holds connecting bar 16 in the socket. The position of bar 20 can be slidably adjusted by loosening another set screw 23 threaded through the wall of tube 21, repositioning the bar 20, and then retightening screw 23 against the bar; however, while such positional adjustability is sometimes desirable, it is not required in the practice of the invention. Tube 21 is fixed to a cross brace 24 which is screwed into the wall of a cylindrical collimator 26. The collimator 26 is adapted to slide over the end of an X-ray cone, not shown, and is rigidly affixed to the cone by tightening another set screw 28. All components of the apparatus are preferably constructed of material such as a hard aluminum alloy so as to permit a rigid connection between the X-ray film support means and the X-ray beam generating means. Aluminum alloy is also preferred because it is opaque to X-rays, which is important in the proper functioning of the collimator 26, as will be appreciated by those skilled in the art.

In use for X-ray diagnostics, an X-ray beam, generated by an X-ray tube to which the cone is affixed, passes through a rectangular opening 29 formed in the collimator 26 and is thereby reduced in cross-section and shaped to conform substantially to the shape of the X-ray film 10; such collimation, of course, limits X-ray exposure of the patient to the minimum necessary for forming an image on film.

In the preferred embodiment shown in FIG. 1, connecting bar 16 extends generally perpendicularly to the axis of the X-ray beam, so as to maintain the face of film 10 perpendicular to the X-ray beam.

A generally elongated rigid bite block 30 formed, for example, of hard acrylic plastic or the like, is removably attached to connecting bar 16 on the side of bar 16 opposite the X-ray film. Attachment means, described hereinbelow, provide for attachment of the bite block 30 at either of two discrete sites relative to the X-ray film. The longitudinal axis of bite block 30 forms an acute angle with the longitudinal axis of connecting bar 16, so as to allow the bite block to be held between the patient's maxilla and mandible at a location removed from the target, in this case on the opposite side of the patient's jaw from the target.

Positioned on the upper and lower bite surfaces of bite block 30 is bite registration material 32 for taking an impression of the patient's teeth (as more clearly indicated in FIG. 2), or of a prosthetic device supported in a fixed position by the patient's alveolar ridge, and thereby providing a fixed reference position for the bite block when a series of X-ray exposures of the target is run at successive times, such as in digital subtraction radiography.

Referring now to FIG. 2, the connecting bar 16, film 10, film support means 12, 14 and bite block 30 with bite registration material 32 thereon are shown in position in a patient's mouth. The patient's teeth, shown partially schematically, have made impressions in the bite registration material 32 and are holding bite block 30 in a position which holds the X-ray film 10 at a location suitable for receiving images of a target area 34 on the side of the patient's jaw opposite the bite block.

It will be appreciated that having bite block 30 held between the maxilla and mandible of the patient at a location removed from the target area enables diagnostic studies of target areas which may be too deteriorated to firmly grip bite blocks of the prior art which are designed to be gripped at or immediately adjacent to the target area.

Figure 3:
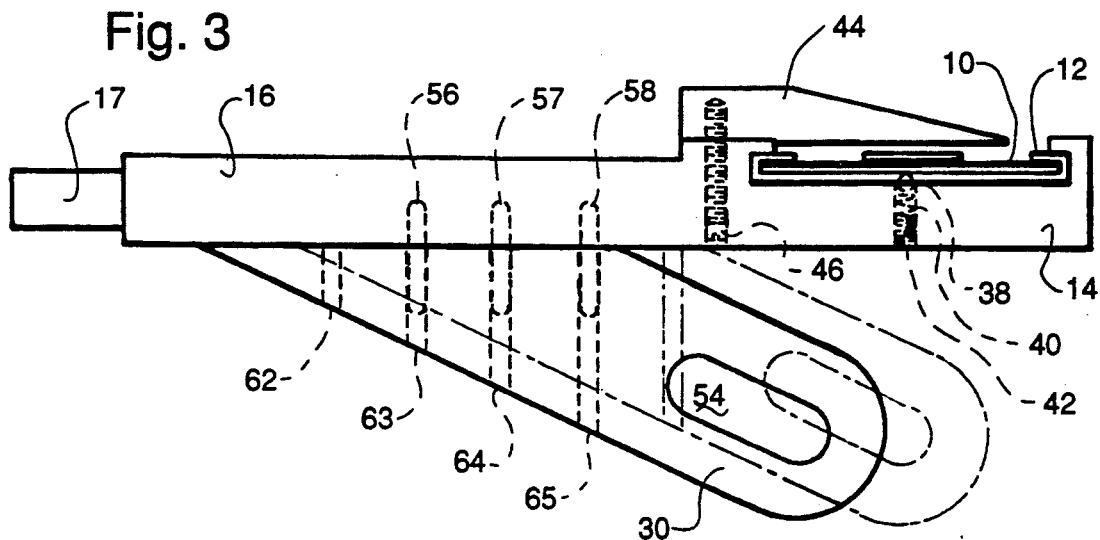
FIG. 3 is a top view of the connecting bar, film and bite block of FIG. 2, showing two discrete attachment sites for the bite block.

FIGS. 3 and 4 show additional features of the bite block film support means of our invention. As is evident from FIG. 4, the X-ray film 10 slides into cassette 12 and cassette 12 is then slidably fitted in bracket 14 formed at one end of connecting bar 16. Cassette 12 may be a generally octagonal flat piece of aluminum as illustrated, having folded-over tabs at its sides and bottom, which hold the film flat against the cassette surface. To allow vertical adjustability of the film position, 3 detents 36 are formed in the back wall of cassette 12; a portion of a ball 38 is urged to protrude from a hole in the surface of bracket 14 by a spring 40 held in place by screw 42 threaded into the bracket, and engages a selected one of detents 36 to both locate the vertical position of cassette 12 and urge the cassette against the inwardly-extending lips of bracket 14. Coupled with the fact that bracket 14 is sized to closely receive cassette 12, this ball and detent arrangement provides very firm support for the cassette and film, which is especially desirable when diagnosis involves repeated exposures.

An aluminum wedge 44 is secured to the front of bracket 14 by means of a screw 46 through the bracket. The wedge is positioned to extend across and in front of the film 10, thereby serving as a penetrameter when X-ray exposures are made.

Bite block 30, which is shown in FIGS. 3 and 4 without bite registration material in place, has upper and lower bite surfaces 50, 52 which are parallel to the longitudinal axis of connecting bar 16. In the preferred embodiment shown, an elongated hole 54 is formed through the bite block near the outboard end thereof; when bite registration material (BRM) is used on both bite surfaces, the hole allows BRM on the top surface to connect with that on the bottom surface when heated to a flowable state, thereby providing a "firmer hold" of the BRM to the bite block.

Bite block 30 is attached to connecting bar 16 by attachment means which include three straight parallel co-planar pins 56, 57, 58 fixed in holes in the connecting bar 16 and projecting from the bar's surface by equal lengths, and four straight parallel transverse bores 62, 63, 64, 65 formed in bite block 30. The size and spacing of the bores 62–65 is such that they can be slid onto pins 56–58 with a fit close enough to provide relatively high friction for firmly holding the bite block in place against the connecting bar. The numbers of pins fixed to the connecting bar 16 and bores formed in bite block 30 can be varied; however, in order to provide more than one discrete mounting site of the bite block on the connecting bar, the number of bores must be at least one more than the number of pins. FIG. 3 shows the bite block 30 attached at two different discrete sites along the connecting bar 16; at the first site, shown in solid lines, pins 56, 57 and 58 are received in bores 63, 64 and 65 respectively, and at the second site, shown in broken lines, the pins are received in bores 62, 63 and 64. The attachment means shown allow one bite block position relative to the patient's jaws to serve for two different posterior or bite wing exposures. In other words, when using bite registration material on the bite block, one impression of the patient's teeth (or prosthetic device as mentioned above) can serve to locate the X-ray film at two different target sites. It will be appreciated that by increasing the number of bores in the bite block of the drawing figures, three or even more different target sites can be examined using a single bite impression to locate the X-ray film. This is a key feature of our invention—regardless of the specific means for attaching the bite block to the connecting bar or other connecting means, the block can be attached at any of a plurality of discrete sites relative to the X-ray film or other image receptor. As above discussed, at least one prior art device includes a bite block which can slide back and forth along a ridge on the film holder; however, such an arrangement is subject to positioning error or variability because of the absence of specific fixed positions for the bite block, a problem which is overcome by our invention.

Although our apparatus can be used satisfactorily without bite registration material (BRM) on the bite block, we prefer to use BRM, and it is required when repeated X-ray exposures are to be made of one target. The prior art includes a number of different BRM's, any of which could be used with varying success in our invention. We have found unexpectedly, however, that superior results can be obtained by the use of an ethyl-vinyl acetate copolymer resin (EVA) as a BRM. Preferably such EVA should contain from 9 to 33 weight percent vinyl acetate, and one which we have found particularly useful contains 25 percent vinyl acetate and is marketed by DuPont under the registered trademark ELVAX 350. This EVA provides accurate impressions with just enough "give" to allow the patient's teeth to fit in easily on repeated uses.

Although the embodiment shown in the drawing figures is arranged for X-ray examination of posterior or bite wing targets, it will be understood that the use of the invention is not restricted to such targets; modifications in design to adapt the invention for use with anterior targets are considered to be within the capability of those skilled in the art.

Also, although our invention has been described with particular reference to X-ray diagnostics, where it has been especially effective, it will be appreciated that the invention is equally useful in systems involving other energy sources and image receptors. For example, the image receptor could be an electronic sensor which, when struck by a suitable energy beam, transmits impulses to a remote video display terminal where the image is displayed on a CRT screen.

While we have shown and described a certain present preferred embodiment of the invention, it is to be distinctly understood that the invention is not limited thereto but may be otherwise variously embodied within the scope of the following claims.

We claim:

1. In apparatus for positioning an image receptor within a patient's mouth in predetermined relation to an energy beam generated by means located externally of the patient's mouth, whereby the energy beam passes through a target comprising a portion of the patient's alveolar ridge and such teeth as are supported thereby, is altered by predetermined characteristics of the target and as so altered strikes the image receptor to cause production of an image which facilitates diagnostic studies of the target, the improvement comprising, in combination:
 a. image receptor support means;
 b. connecting means rigidly connecting the image receptor support means to the energy beam generating means;
 c. a rigid bite block having upper and lower bite surfaces adapted to be held between the patient's maxilla and mandible when the patient bites down thereon; and
 d. means removably attaching the bite block to the connecting means in a position such that the bite block can be held between the maxilla and the mandible of the patient at a location removed from the target, the attachment means further providing for attachment of the bite block at any of a plurality of discrete sites relative to the image receptor, whereby a plurality of targets can be studied using one bite block position within the patient's mouth.

2. Apparatus as claimed in claim 1 in which the connecting means include a connecting bar extending generally at right angles to the axis of the energy beam, the image receptor support means being located at one end of the connecting bar, and the bite block attachment means comprise:
 a. a predetermined number of straight pins of uniform dimensions fixed to and projecting from the connecting bar, the pins being parallel and co-planar, the distances between adjacent pins being constant; and
 b. a plurality of parallel bores formed in the bite block at spacing equal to that of the pins, the size of the bores being such that the pins can be slidably closely received therein, the number of bores being at least one more than the number of pins.

3. In apparatus for positioning an image receptor within a patient's mouth in predetermined relation to an energy beam generated by means located externally of the patient's mouth, whereby the energy beam passes through a target comprising a portion of the patient's alveolar ridge and such teeth as are supported thereby, is altered by predetermined characteristics of the target, and as so altered strikes the image receptor to cause production of an image which facilitates diagnostic studies of the target, the improvement comprising, in combination:
 a. image receptor support means;
 b. connecting means rigidly connecting the image receptor support means to the energy beam generating means, the connecting means including a connecting bar extending generally at a right angle to the axis of the energy beam, the image receptor support means being located at one end of the connecting bar;
 c. a rigid bite block having upper and lower bite surfaces adapted to be held between the patient's maxilla and mandible when the patient bites down thereon, the upper and lower bite surfaces being parallel to the longitudinal axis of the connecting bar, the bite block having a generally elongated shape, the longitudinal axis of the bite block forming an acute angle with the longitudinal axis of the connecting bar; and
 d. means removably attaching the bite block to the connecting means in a position such that the bite block can be held between the maxilla and the mandible of the patient at a location removed from the target, the attachment means further providing for attachment of the bite block at any of a plurality of discrete sites relative to the image receptor, the attachment means comprising, (i) a predetermined number of straight pins of uniform dimensions fixed to and projecting from the connecting bar, the pins being parallel and co-planar, the distances between adjacent pins being constant; and (ii) a plurality of parallel bores formed in the bite block at spacing equal to that of the pins, the size of the bores being such that the pins can be slidably closely received therein, the number of bores being at least one more than the number of pins, whereby a plurality of targets can be studied using one bite block position within the patient's mouth.

4. Apparatus as claimed in claim 3 wherein the number of straight pins is three and the number of bores in the bite block is four.

5. Apparatus as claimed in claim 4 wherein the energy beam is an X-ray beam and the image receptor comprises X-ray film.

6. Apparatus as claimed in any of claims 1, 2, 4, 5 and 9, further including bite registration material applied to the bite block in such manner as to take an impression of the patient's teeth, or of a prosthetic device supported in a fixed position by the patient's alveolar ridge, whereby the bite block location in relation to said teeth or prosthetic device will remain constant for repeated uses of the bite block.

7. Apparatus as claimed in claim 6 wherein the bite registration material comprises an ethyl-vinyl acetate copolymer resin.

8. Apparatus as claimed in claim 7 in which the resin contains from 9 to 33 weight percent of vinyl acetate.

* * * * *

UNITED STATES PATENT AND TRADEMARK OFFICE
CERTIFICATE OF CORRECTION

PATENT NO. : 5,090,047
DATED : February 18, 1992
INVENTOR(S) : Marshall A. Angotti, Frank J. Lopez and Richard C. Margraf It is certified that error appears in the above-identified patent and that said Letters Patent is hereby corrected as shown below:

In claim 6, column 8, lines 39-40 of the patent, delete "1, 2, 4, 5 and 9" and substitute --1 through 5-- therefor.

Signed and Sealed this

Fourth Day of May, 1993

Attest:

MICHAEL K. KIRK

Attesting Officer

Acting Commissioner of Patents and Trademarks